No. 762,257. PATENTED JUNE 7, 1904.
W. M. SCOTT.
SYSTEM OF DISTRIBUTION.
APPLICATION FILED AUG. 18, 1903.
NO MODEL.
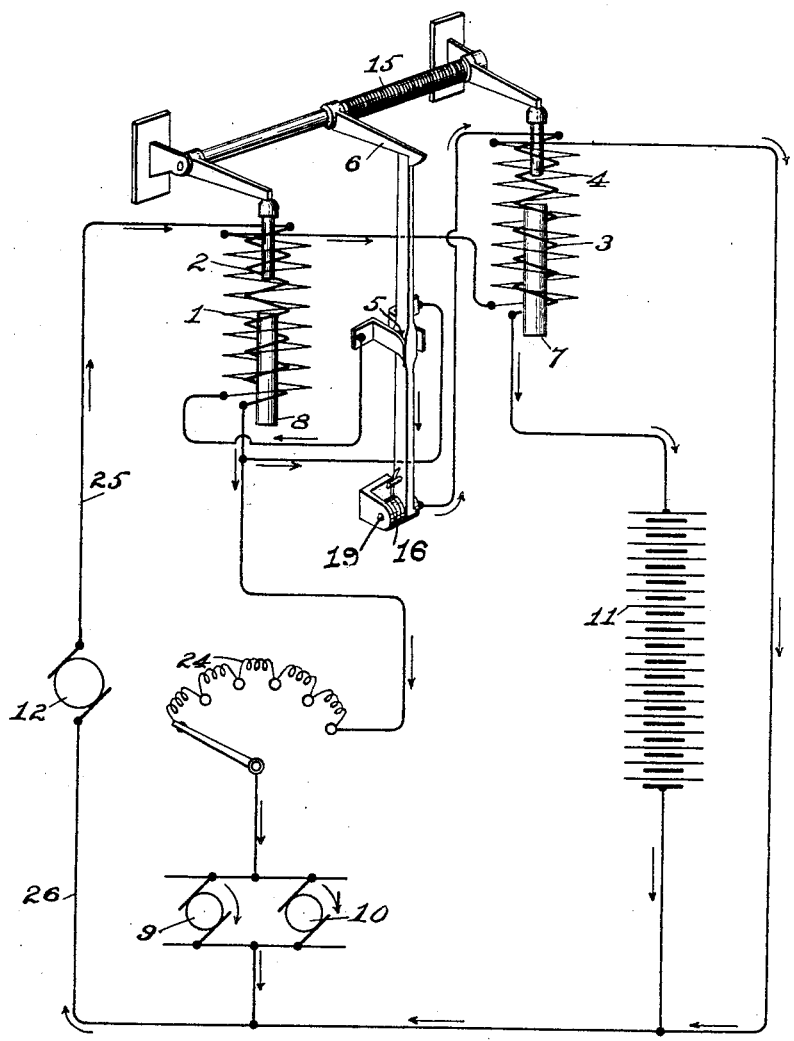
WITNESSES:
James M. Sawyer
C. L. Ehret
INVENTOR
Wm. M. Scott
BY
Jno. K. Woodale
ATTORNEY.

No. 762,257. Patented June 7, 1904.

UNITED STATES PATENT OFFICE.

WILLIAM M. SCOTT, OF PHILADELPHIA, PENNSYLVANIA, ASSIGNOR TO CUTTER ELECTRICAL AND MANUFACTURING COMPANY, A CORPORATION OF NEW JERSEY.

SYSTEM OF DISTRIBUTION.

SPECIFICATION forming part of Letters Patent No. 762,257, dated June 7, 1904.

Original application filed December 11, 1901, Serial No. 85,484. Divided and this application filed August 18, 1903. Serial No. 169,871. (No model.)

*To all whom it may concern:*

Be it known that I, WILLIAM M. SCOTT, a citizen of the United States, residing at Philadelphia, in the county of Philadelphia and State of Pennsylvania, have invented a new and useful System of Distribution, of which the following is a specification.

My invention relates to a system for distributing electrical energy in which are employed apparatus capable of causing a reverse flow of energy in either direct or alternating current working, such as storage batteries, generators running in parallel, rotary transformers, motor generator sets, and the like.

The object of my invention is to provide means for changing the condition of a circuit containing a device absorbing or emitting electrical energy upon the occurrence of any of several abnormal or undesired conditions.

As an example of my system of distribution the following may serve: A mining-locomotive, which is operated in general upon the same system as the well-known trolley-car, but on account of the fact that some of the mine-galleries through which such locomotive is required to pass are low and restricted the connection with the source of current or feed conductors is broken and the locomotive is driven during such time by energy derived from a storage battery carried by it. Normally when the traveling contact of the locomotive is in communication with the main source of energy the motors and storage battery receive current from such source. It is desirable in such a system to prevent a too rapid charging of the storage battery or upon excessive drop in potential at the terminals of the supply source a too great discharge back into the line or an excessive discharge through the motors, and the device herein described and the circuit arrangements, in addition to performing the above-named functions, will operate to control or interrupt the circuit when the motors are taking too much current from the line.

As stated above, upon the occurrence of a drop of the line-potential below that of the storage battery said battery will discharge into the line as well as into the motors and unnecessarily exhaust itself.

Reference is to be had to the accompanying drawing, in which the figure is a diagrammatic view of the circuit connections of my system.

At 5 is shown the switch carried by the locomotive in the example given, which interrupts the circuit of the storage battery 11. This switch interrupts the circuit also of the coils 1 and 4. This switch is actuated by the spring 16, which normally tends to throw it to open-circuit position, and 6 indicates a latch for holding the same in circuit-closing position. Said latch 6 is urged in a forward and downward direction by the spring 15. The switch-blade 5 is supported on the pivot 19, which is surrounded by the spring 16.

1, 2, 3, and 4 are solenoid-coils. Coils 1 and 2 are associated together in relation with the same movable core 8. Coils 3 and 4 are also provided with and actuate the same movable core 7 upon predetermined electrical conditions obtaining, as hereinafter described, the result being to operate the latch 6 to release the switch.

It is to be understood that in place of a core and solenoid may be used coil, stationary core, and movable armature.

Coils 1 and 4 are potential coils, by which I mean windings of comparatively great numbers of turns of conductor having relatively small cross-section, which are adapted to respond to changes in potential of the circuit rather than current.

Coils 2 and 3 are current-coils, by which I mean relatively coarse wire windings, which are adapted to respond to fluctuations in current strength and to be more or less independent of potential variations.

At 12 is shown the source of energy supplying current through conductors 25 and 26, the former of which may be in the example of the trolley system or mining-locomotive the trolley-wire and the latter the rail or return-conductor, or vice versa.

9 and 10 are the car or locomotive motors or other translating devices. subject to the control of a device 24, such as a rheostat or trolley-car controller, switch, &c. These motors are connected with conductor 26 and through the coil 2 with conductor 25. Current is also supplied from the conductor 25 through the coil 2 and switch 5 when closed to the storage battery or other device capable of causing a reverse flow of energy. Such current passes also through the coil 3. Coils 2 and 3 are composed of relatively large conductor and of relatively few turns and are styled "current-coils." The remaining terminal of the storage battery 11 connects with the conductor 26. Coil 1 has it lower terminal in electrical communication with the switch 5, and therefore receives current from conductor 25 through the coil 2, its remaining terminal connecting through coil 4 with conductor 26.

With the switch closed, as shown in the drawing, and everything operating normally—as, for example, the locomotive running with its trolley in contact with the trolley-wire and the motors and battery receiving current from the generator 12—coils 1 and 2 operate differentially—that is, their magnetizing effects upon the core 8 are opposed to each other. Similarly and under the same circumstances coils 3 and 4 are operated differentially—that is, their magnetizing effects on the core 7 are opposed to each other.

Upon an abnormal current flowing in the circuit of the motors 9 and 10 coil 2 has ampere-turns sufficient to overcome the effect of coil 1 and causes the core 8 to rise, with the result that the latch 6 is caused to release the switch 5, which then opens.

Under normal conditions the ampere-turns of coil 1 are almost sufficient to raise the core 8 and cause the opening of the switch 5, and such ampere-turns may be in the neighborhood of ninety-five per cent. of the total ampere-turns necessary to operate the switch with the core adjusted in a certain position. This being the case, it is seen that it will require a relatively large current flowing through coil 2 to sufficiently overcome the effect of coil 1 to cause the opening of the circuit. In fact, coil 2 will be required to have approximately one hundred and ninety-five per cent. of the total ampere-turns required to operate the switch when the core 8 is adjusted in such certain position. On the other hand, if the potential of generator 12 should for any reason fall below the potential of the battery 11 said battery would discharge and deliver current back into the line and into the motors. The energy returned to the line from the battery 11 would flow through coil 2, and since this is in the reverse direction from normal coils 1 and 2 would operate cumulatively—that is, their magnetizing effects would be added—and core 8 would be attracted and open the circuit. In this case coil 2 would be required to supply but a small number of ampere-turns, for the reason stated above—namely, that coil 1 is in itself almost sufficient to cause the operation of the switch.

In case the energy supplied to the motors by the battery 11 should be excessive either in the case when said battery is discharging into line and motors or when the trolley is off and battery 11 is discharging through the motors only there is a flow of current through coil 3 in a sense opposite to normal, with a resulting cumulative action of the coils 3 and 4 sufficient to open the switch.

With the trolley off and the motors 9 and 10 taking but their normal amount of energy the current through coil 3 is not sufficient to cause cumulatively with coil 4 the opening of the switch.

It is seen that with all parts operating normally coil 2 carries all the current supplied both to the motors and to the storage battery, and under such circumstances coils 1 and 2 are differential in their effect upon the core 8. Upon reversal of direction of flow of energy through the coil 2 coils 1 and 2 operate cumulatively on the core 8.

When the battery 11 is being charged, coils 3 and 4 operate differentially upon the core 7, and when the battery 11 is discharging coils 3 and 4 operate cumulatively upon the core 7. The proportions of the coils 3 and 4 are so taken or the core 7 so adjusted as to its height, or both, that a reversed or discharging current flowing through coil 3 must be of a magnitude, in order to operate cumulatively with coil 4 to operate the switch, greater than the current discharging from battery 11 back into line, under certain circumstances described, to cause core 8 to be lifted to operate the switch.

From the above description it is seen that my circuit arrangements and system are such as to protect the battery or any device capable of causing a reversed energy-flow, both under conditions of wide fluctuations in potential, excessive supply of current, or predetermined reversed current or energy flow, or excessive flow of energy in a local circuit (motors 9 and 10 and the battery 11) when the main supply-generator is cut off.

Coils 1 and 4 have been shown connected in series, the object of this being to obtain a comparatively high resistance in the potential coil-circuits in order to keep down as much as possible the $C^2R$ or heat loss in said circuits. It is to be understood, however, that said coils may be connected in parallel arrangement without departing from the spirit of my invention.

It is customary in charging secondary batteries to do so at a rate higher than that at which said batteries are permitted to discharge, and it is seen from a previous description that my circuit arrangements are such as to permit a rate of charge greater than the rate of discharge without opening the switch. It is to be further understood that my invention is not limited to electromagnetic means for operating upon a switch to accomplish the results above described, for it is possible to substitute for the magnets herein shown and described other electroresponsive devices which will operate to produce the results attained by the coil herein described. It is to be understood also that my invention is not limited to a device or circuit arrangements for completely rupturing a circuit, but that any means may be used in place of the rupturing-switch which will change the electrical conditions or constants of a circuit—for example, in direct-current working the insertion or withdrawal of a resistance, and in alternating-current working the insertion or withdrawal of an inductance, capacity, or resistance, or any combination of them.

This application is a division of my application filed December 11, 1901, and bearing Serial No. 85,484.

What I claim is—

1. In combination with a charging-generator, a storage battery and connections therefor, an automatic magnetic circuit-breaker having separable coöperative contacts, means for causing their separation, means for normally restraining the separating means, and means for actuating the restraining means, said actuating means consisting of two coils provided with and actuating a movable core or armature, one coil carrying a current varying in direction with respect to the direction of current in the other coil and the actuation of the device depending upon the relative directions of the currents in the respective coils and upon volume of current in the coils, substantially as described.

2. In combination with a charging-generator, a storage battery and connections therefor, an automatic circuit-breaker, having separable coöperative contacts, means for causing their separation, means for normally restraining the separating means and means for actuating the restraining means, said actuating means consisting of two coils provided with and actuating a movable core or armature, one coil carrying a current varying in direction with respect to the direction of current in the other coil and the actuation of the device depending upon the relative directions of the currents in the respective coils and upon volume of current in one of the coils, substantially as described.

3. In combination with a charging-generator, a storage battery and connections therefor, an automatic magnetic circuit-breaker, having separable coöperative contacts, means for causing their separation, means for normally restraining the separating means, and means for actuating the restraining means, said actuating means consisting of two coils provided with and actuating a movable core, or armature, one coil in shunt with the device to be protected and the second coil carrying a current subject to variation in direction with regard to that of the first coil, the action depending upon the volume of the current in the first coil and the volume and direction of the current in the second coil, substantially as described.

4. In combination with a charging-generator, a storage battery and connection therefor, an automatic magnetic circuit-breaker having separable coöperative contacts, means for causing their separation, means for normally restraining the separating means, and means for actuating the restraining means consisting of two coils provided with and actuating a movable core or armature, one coil carrying current constant in direction, the other carrying current subject to reversal of direction, the unidirectional coil actuating the core or armature when its magnetic pull is sufficient to overcome the opposition of the other coil when its current-flow is opposite, and both coils actuating the core when the current flows in the same direction in both, substantially as and for the purpose described.

5. In combination with a charging-generator, a storage battery and connection therefor, an automatic magnetic circuit-breaker having separable coöperative contacts, means for causing their separation, means for normally restraining the separating means, and means for actuating the restraining means consisting of two coils provided with and actuating a movable core, or armature, one coil carrying current constant in direction, the other carrying current subject to reversal of direction, the varying directional coil actuating the core or armature when its magnetic pull is sufficient to overcome the opposition of the unidirectional coil when its current-flow is opposite, and both coils actuating the core or armature when the current flows in the same direction in both, substantially as and for the purpose described.

6. In combination with a charging-generator, a storage battery and connections therefor, an automatic magnetic circuit-breaker employing two coils one of which depends for its current upon the battery-pressure, the other carrying the line-current, the latter coöperating with or opposing the former depending upon direction of line-current, separable coöperative contacts, means for causing their separation, means for normally restraining the separating means, and a core or armature operated by said two coils for actuating the restraining means, substantially as described.

7. In combination with a charging-generator, a storage battery and connections therefor, an automatic magnetic circuit-breaker employing two coils one of which depends for its current upon the battery-pressure, the other carrying the battery-current, the latter coöperating with or opposing the former depending upon direction of line-current, separable coöperative contacts, means for causing their separation, means for normally restraining the separating means, and a movable core or armature operated by said two coils for actuating the restraining means, substantially as described.

8. In combination with a storage battery, and a charging-generator, and connections therefor, an automatic magnetic circuit-breaker comprising separable coöperative contacts, means for causing their separation, means for normally restraining the separating means, and automatic magnetic means for actuating the restraining means, said automatic magnetic means comprising three coils, the first in series with the charging-line, the second in shunt with the battery and both operating a movable core or armature to actuate the restraining means upon the occurrence of predetermined electrical conditions, the third coil connected in the battery-circuit and also provided with a movable core or armature to actuate the restraining means upon the occurrence of predetermined electrical conditions, substantially as described.

9. In combination with a storage battery and a charging-generator, and connections therefor, an automatic magnetic circuit-breaker employing three coils, one of which depends for its current upon the battery-pressure another carrying the line-current, the latter coöperating with or opposing the former depending upon direction of line-current and both operating a movable core or armature to actuate the restraining means hereinafter described upon the occurrence of predetermined electrical conditions, the third coil connected in the battery-circuit and also provided with a movable core or armature to actuate the restraining means hereinafter described upon the occurrence of predetermined electrical conditions, separable coöperative contacts, means for causing their separation, means for normally restraining the separating means until actuated by the movable cores above described, substantially as described.

10. In combination with a storage battery and a charging-generator and connections therefor, an automatic magnetic circuit-breaker having separable coöperative contacts, means for causing their separation, means for normally restraining the separating means, and means for actuating the restraining means, said actuating means consisting of four coils, the first two provided with and actuating a core or armature, the first connected in series with the line-circuit and the second connected in shunt around the battery, the first actuating the core or armature upon predetermined maximum flow therein sufficient to overcome the opposition of the second coil during opposite flow therein and both actuating the core when flow in both coils is in the same direction, the second two coils provided with and actuating a core or armature, the first of said second pair connected in the battery-circuit and the second in shunt around the battery, the first actuating the core or armature, upon predetermined maximum flow therein sufficient to overcome the opposition of the second coil during opposite flow therein and both actuating the core or armature when flow in both coils is in the same direction, substantially as described.

11. In a system of electrical distribution, a generator, a motor, a secondary battery supplied thereby, an automatic switch in the circuit of said secondary battery, a plurality of tripping means for said switch, one of said means comprising a differential electromagnet operative to control said switch upon abnormal direct energy-flow or slight reversed energy-flow, and another of said means comprising a differential electromagnet operative to control said switch upon excessive flow of current from said battery through said motor.

12. In a system of electrical distribution, a source of energy, a plurality of circuits controlled thereby, a circuit-controller included in one of said circuits, a differential electromagnet having a current-coil in the main circuit and a potential-coil for releasing said controller, and an independent differential electromagnet having a current-coil in the circuit of a controller and a potential-coil, adapted to release said controller, said potential-coils being connected in series with each other and in parallel with the circuits supplied by said source of energy.

13. In a system of electrical distribution, a source of energy, a translating device supplied thereby, a translating device capable of causing reversed energy-flow supplied thereby, said translating devices being in parallel circuits, means for causing the interruption of the energy-supply from said source to said translating devices and automatic means for disconnecting said parallel circuits from each other upon the occurrence of predetermined reversed energy-flow from said translating device capable of causing reversed energy-flow.

14. In a system of electrical distribution, a source of energy, a translating device supplied thereby, a translating device capable of causing reversed energy-flow supplied thereby, automatic means for interrupting the energy supplied from said source to said translating devices upon excessive energy-flow in normal direction, and automatic means for disconnecting said parallel circuits from each other upon the occurrence of predetermined reversed energy-flow.

15. In a system of electrical distribution, a source of energy, a translating device supplied thereby, a translating device capable of causing reversed energy-flow supplied thereby, automatic means for disconnecting said source from said translating devices upon the occurrence of excessive energy-flow in normal direction or upon very slight reversed energy-flow, and automatic means for interrupting connection between said translating devices upon the occurrence of predetermined reversed energy-flow from said translating device capable of causing reversed energy-flow to said first-named translating device.

16. In a system of electrical distribution, a source of energy, a translating device supplied thereby, a translating device capable of causing reversed energy-flow supplied thereby, an automatic electric switch for disconnecting said source of energy from said translating devices comprising a plurality of independent tripping-magnets, one of said magnets adapted to trip said switch upon excessive energy-flow in normal direction and another adapted to trip said switch upon predetermined reversed energy-flow from said translating device capable of causing reversed energy-flow.

17. In a system of electrical distribution, a source of energy, a translating device supplied thereby, a translating device capable of causing reversed energy-flow supplied thereby, an automatic electric switch for disconnecting said translating devices from said source of energy and comprising a plurality of tripping-magnets, one of said magnets being responsive to excessive flow of energy in normal direction and very slight flow of energy in a direction other than normal, and another of said magnets being responsive to predetermined reversed flow of energy from said translating device capable of causing reversed energy-flow.

18. In a system of electrical distribution, a source of energy, a translating device supplied thereby, a translating device capable of causing reversed energy-flow supplied thereby and automatic means for disconnecting said translating devices from each other upon the occurrence of predetermined energy-flow from one of said translating devices to the other, in case said translating devices have become disconnected from said source of energy.

19. In a system of electrical distribution, a source of energy, a motor supplied thereby, a secondary battery supplied thereby, automatic means for disconnecting said motor and said secondary battery from said source of energy upon excessive energy-flow in normal direction, and automatic means for disconnecting said motor from said secondary battery upon excessive flow of energy from said battery to said motor.

20. In a system of electrical distribution, a source of energy, a motor and secondary battery supplied thereby, automatic means for disconnecting said motor and battery from said source upon the occurrence of excessive energy-flow from said source in normal direction, or upon slight reversed energy-flow, and automatic means for disconnecting said motor from said secondary battery upon the occurrence of predetermined energy-flow from said battery to said motor.

21. In a system of electrical distribution, a source of energy, a motor and secondary battery supplied thereby, an automatic electric switch comprising means responsive to excessive energy-flow from said source for tripping said switch, and comprising means responsive to predetermined energy-flow from said battery to said motor for tripping said switch.

22. In a system of electrical distribution, a source of energy, a motor and secondary battery supplied thereby, an automatic electric switch comprising means responsive to slight reversed energy-flow from said battery to said source for tripping said switch, and comprising means responsive to predetermined energy-flow from said battery to said motor for tripping said switch.

23. In a system of electrical distribution, a source of energy, a motor and secondary battery supplied thereby, an automatic electric switch comprising means responsive to excessive energy-flow from said source or slight reversed energy-flow from said battery to said source for tripping said switch, and comprising means responsive to predetermined energy-flow from said battery to said motor for tripping said switch.

24. In a system of electrical distribution, a source of energy, a motor and secondary battery supplied thereby, an automatic electric switch in the circuit of said secondary battery comprising means responsive to decrease of potential of said source of energy for tripping said switch, and comprising means responsive to predetermind energy-flow from said battery to said motor for tripping said switch.

25. In a system of electrical distribution, a source of energy, a motor and secondary battery supplied in parallel thereby, an automatic electric switch having a differential tripping-coil, having a current-winding and a potential-winding, and responsive to excessive direct energy-flow or slight reversed energy-flow for tripping said switch, whereby said source of energy, motor, and secondary battery, are disconnected each from the others.

26. In a system of electrical distribution, a source of energy, a motor and secondary battery supplied thereby, an automatic electric switch having a differential tripping-magnet responsive to excessive direct energy-flow from said source or slight reversed energy-flow to said source for tripping said switch, and a further differential tripping-magnet responsive to predetermined energy-flow from said battery to said motor for tripping said switch.

WM. M. SCOTT.

Witnesses:
C. D. EHRET,
MAE HOFMANN.